US012579138B1

(12) United States Patent
Jankowski et al.

(10) Patent No.: US 12,579,138 B1
(45) Date of Patent: Mar. 17, 2026

(54) COMPILED QUERY EXECUTION AND DEBUGGING

(71) Applicant: Amazon Technologies, Inc., Seattle, WA (US)

(72) Inventors: Konrad Jankowski, Ennis (IE); Andrea Olgiati, Gilroy, CA (US)

(73) Assignee: Amazon Technologies, Inc., Seattle, WA (US)

( * ) Notice: Subject to any disclaimer, the term of this patent is extended or adjusted under 35 U.S.C. 154(b) by 528 days.

(21) Appl. No.: 14/970,298

(22) Filed: Dec. 15, 2015

(51) Int. Cl.
*G06F 16/2453* (2019.01)
*G06F 16/242* (2019.01)

(52) U.S. Cl.
CPC ........ *G06F 16/2453* (2019.01); *G06F 16/242* (2019.01)

(58) Field of Classification Search
CPC .. G06F 16/24524; G06F 9/48; G06F 9/30181; G06F 16/2453; G06F 16/242; G06F 16/24532; G06F 16/24549; G06F 16/24542; G06F 16/2471; G06F 11/3419; G06F 16/2438; G06F 17/3044; G06F 17/30442; G06F 17/30389; G06F 8/443; G06F 11/3624; G06F 11/3628; G06F 11/3664; G06F 8/4441; G06F 8/447; G06F 11/3612; G06F 8/41; G06F 9/45516; G06F 16/1727; G06F 16/21; G06F 16/2264; G06F 16/2272; G06F 16/2379; G06F 16/285; G06F 16/583; G06F 16/951; G06F 16/9535; G06F 16/24578; G06F 16/95; G06F 16/957;

G06F 16/954; G06F 16/24575; G06F 16/2423; G06F 16/955; G06F 16/9577; G06F 11/3636; G06F 8/456
See application file for complete search history.

(56) References Cited

U.S. PATENT DOCUMENTS

| | | | | | |
|---|---|---|---|---|---|
| 6,081,801 | A * | 6/2000 | Cochrane | ............... | G06Q 10/04 |
| 7,984,043 | B1 * | 7/2011 | Waas | ................ | G06F 17/30932 |
| | | | | | 707/718 |
| 2003/0066060 | A1 * | 4/2003 | Ford | ........................ | G06F 8/443 |
| | | | | | 717/158 |
| 2005/0149313 | A1 * | 7/2005 | Roesner | ......... | G01R 31/318364 |
| | | | | | 703/22 |
| 2006/0015855 | A1 * | 1/2006 | Kumamoto | ........... | G06F 9/3851 |
| | | | | | 717/136 |
| 2007/0270212 | A1 * | 11/2007 | Cockerille | .............. | G06F 8/658 |
| | | | | | 463/29 |
| 2011/0271263 | A1 * | 11/2011 | Archer | ....................... | G06F 8/45 |
| | | | | | 717/149 |
| 2012/0159444 | A1 * | 6/2012 | Agarwal | ............. | G06F 11/3624 |
| | | | | | 717/124 |

(Continued)

*Primary Examiner* — Ajay M Bhatia
*Assistant Examiner* — Berhanu Mitiku
(74) *Attorney, Agent, or Firm* — Davis Wright Tremaine LLP

(57) ABSTRACT

A computing system may comprise a master computing node and a servant computing node. The master may compile a query to form a first version of a program that performs the query on the servant. The first version of the program may be compiled using a compiler configuration that excludes instrumentation, in order to reduce latency associated with the initial processing of the query. A second version of the program may be compiled with instrumentation, and may be executed in response to subsequent requests to process the query.

20 Claims, 9 Drawing Sheets

(56)        References Cited

U.S. PATENT DOCUMENTS

| | | | | |
|---|---|---|---|---|
| 2013/0185704 A1* | 7/2013 | Kuesel | ................ | G06F 9/44521 |
| | | | | 717/151 |
| 2013/0239093 A1* | 9/2013 | Nori | .................... | G06F 9/44589 |
| | | | | 717/126 |
| 2013/0258400 A1* | 10/2013 | Kobayashi | ........... | H04N 1/0049 |
| | | | | 358/1.15 |
| 2014/0289707 A1* | 9/2014 | Guan | .................. | G06F 11/3628 |
| | | | | 717/124 |
| 2015/0347102 A1* | 12/2015 | Lattner | ................ | G06F 21/577 |
| | | | | 717/146 |
| 2016/0092189 A1* | 3/2016 | Pollack | .................... | G06F 8/65 |
| | | | | 717/175 |
| 2016/0291951 A1* | 10/2016 | Dahan | ................ | G06F 11/3624 |
| 2017/0310740 A1* | 10/2017 | Wang | ........................ | G06F 9/54 |

* cited by examiner

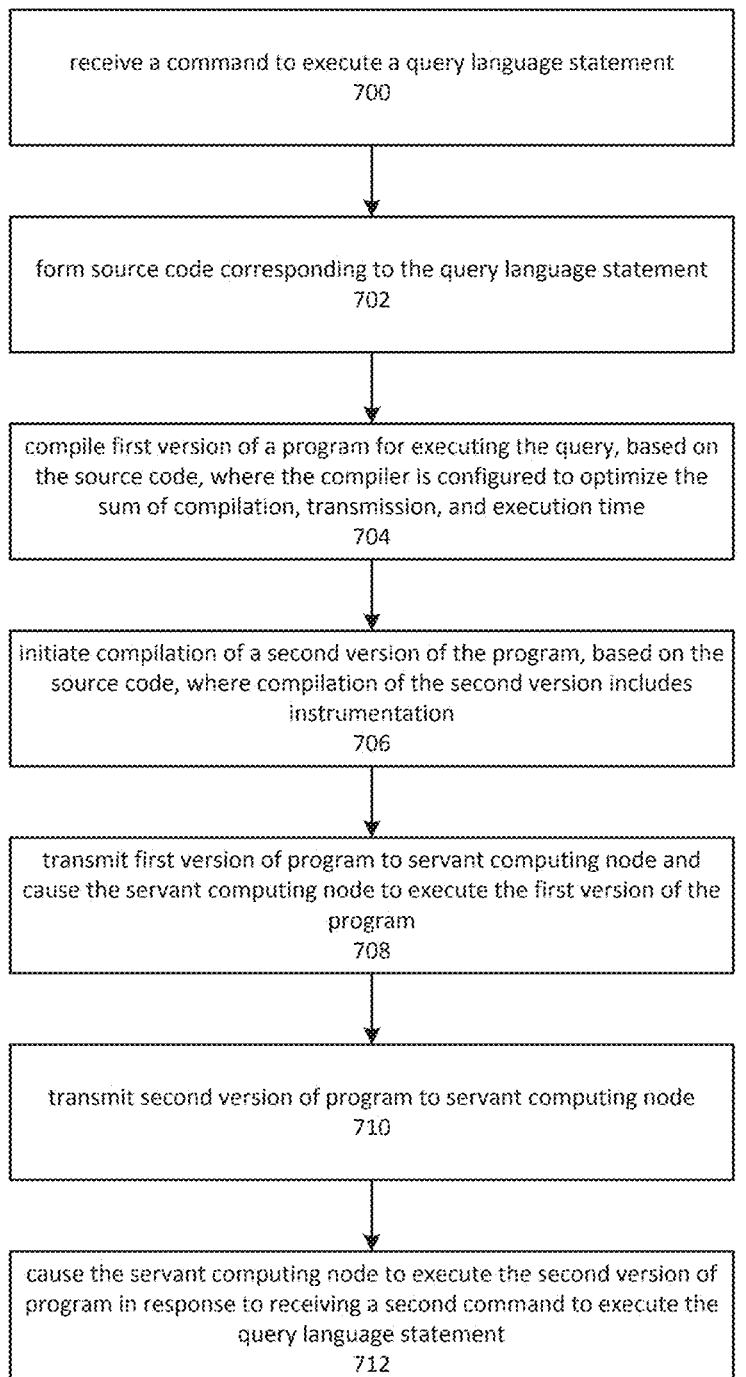

receive a command to execute a query language statement
700 form source code corresponding to the query language statement
702 compile first version of a program for executing the query, based on the source code, where the compiler is configured to optimize the sum of compilation, transmission, and execution time
704 initiate compilation of a second version of the program, based on the source code, where compilation of the second version includes instrumentation
706 transmit first version of program to servant computing node and cause the servant computing node to execute the first version of the program
708 transmit second version of program to servant computing node
710 cause the servant computing node to execute the second version of program in response to receiving a second command to execute the query language statement
712

FIG. 7

COMPILED QUERY EXECUTION AND DEBUGGING

BACKGROUND

Distributed computing systems may process large or complex tasks, such as database queries, by subdividing the work to be performed among a number of computing nodes. A computing node designated as a master may coordinate the work performed by each of a number of designated servant computing nodes. The master computing node may provide each of the servant computing nodes instructions that describe the portion of the task that the given servant is to perform. In some cases, the master may provide these instructions as computer-executable instructions. The computer-executable instructions might, for example, provide a servant computing node with an executable program that executes a database query on the servant computing node.

In order to increase the performance of the distributed computing system, the executable programs might be compiled in a manner that emphasizes attributes such as the speed at which the executable program executes. However, the emphasis on program speed may interfere with certain aspects of operating the system, such as diagnosing faults.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

FIG. 7 is a flow diagram depicting executing a query using two-stage query compilation.

DETAILED DESCRIPTION

Figure 1:
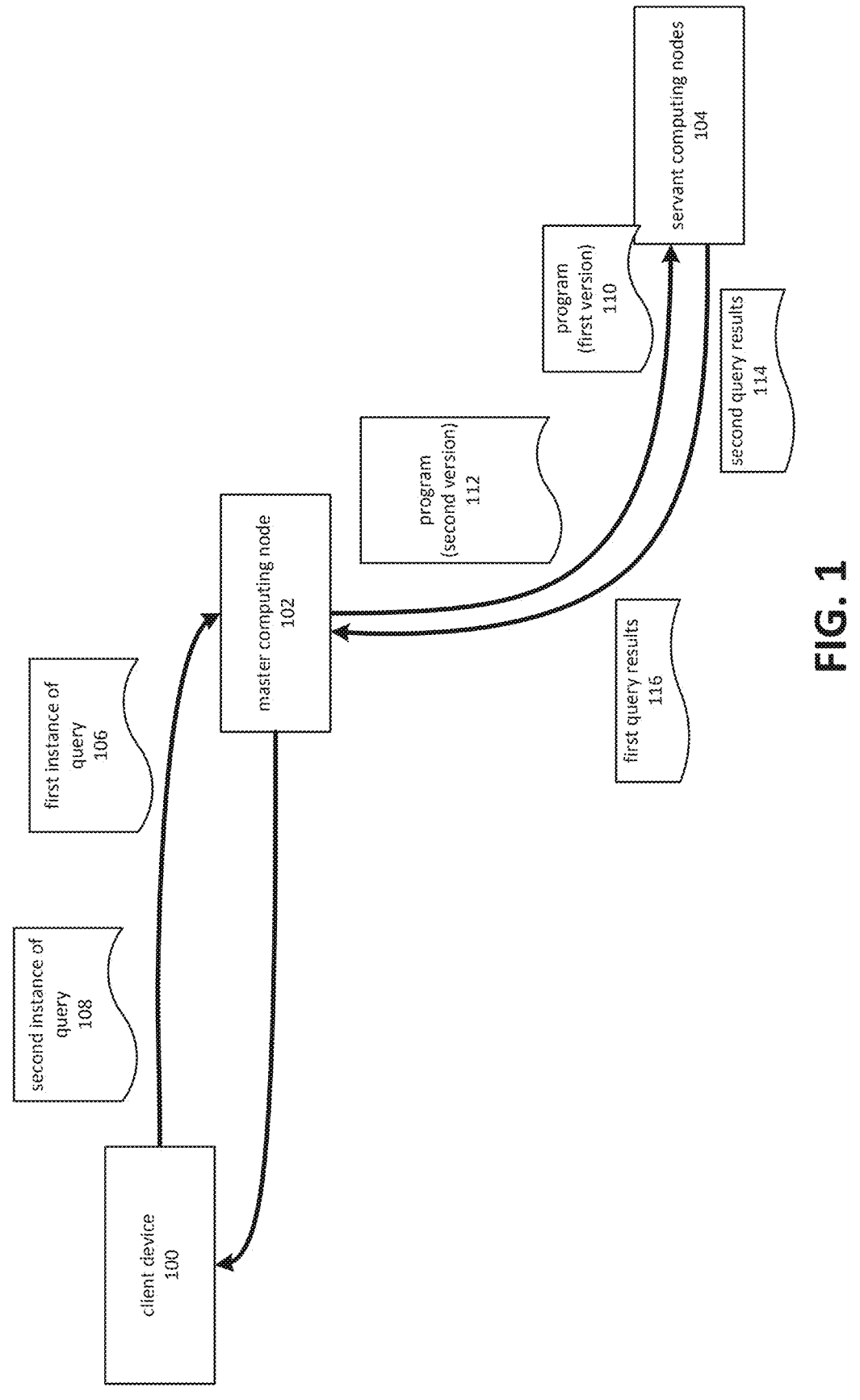
FIG. 1 is a block diagram depicting a distributed computing system using queries compiled in two stages.

Disclosed herein are systems, methods, and computer program products for executing compiled programs in a distributed computing system. In an example, a distributed computing system may comprise a master computing node and one or more servant computing nodes. The master computing node may receive a request to retrieve or otherwise process data maintained on the servant computing nodes. The request may comprise a query that indicates which data is to be retrieved or how the data is to be processed. To process the query, the master computing node may compile the query into a program that may be executed on the servant computing nodes. When executed on a servant computing node, the program may, for example, access data stored on the servant computing node, filter the data in the manner specified by the query, and send the data back to the master computing node. The master computing node may then join the data with other data returned by the other servant computing nodes.

The time used to process the query may be dependent on various factors. One such factor is the time used to compile the program. The query supplied with the request to process data may be converted into source code and compiled. The latter operation may be performed with a compiler, an executable program for converting the source code into computer-executable instructions. A second factor contributing to the time used to process the query is the time used to transmit the compiled program from the master computing node to the servant computing node. Typically, this is related to the size of the compiled program. A third factor is the time taken by the program to execute on the servant computing node.

The configuration of the compiler may contribute to or ameliorate the various factors that influence the time used to process the query. The compiler may, for example, be configured to optimize code generation with respect to speed and/or size. The compiler may also be configured to include or exclude instrumentation, such as debugging symbols, which may contribute to increased compilation time, transmission time, and program execution time. There may, however, be instances where instrumentation is required to debug problems that may occur when the program is executed.

In an example, a master computing node may compile two versions of a program. The first version of the program may be compiled using a compiler configuration that reduces the total effect of the various factors that contribute to the time used to process the query. The configuration may be such that instrumentation is not generated for the first version of the program. Once compiled, the first version of the program may be transmitted to a servant computing node and executed. A second version of the program may also be compiled. The configuration of the compiler may be such that instrumentation is included in the second version. As such, the second version of the program may take longer to compile, transmit, and execute than the first version of the program. However, the second version of the program may be compiled and transmitted to the servant computing node while the first version of the program is being transmitted and executed.

The configuration of the compiler used in the first instance, for generation of the first version of the program, allows for request latency to be minimized, or in other words reduced, when a query is first processed. Subsequent requests to process the same query may be performed using the second version of the program. In this manner, initial request latency is reduced while subsequent requests may be executed with an instrumented program, thereby aiding diagnostic procedures such as debugging.

FIG. 1 is a block diagram depicting a distributed computing system using queries compiled in two stages. As depicted by FIG. 1, a client device 100 may send queries 106 and 108 to a distributed database or other distributed computing system. The queries 106 and 108 may, for exemplary purposes, be assumed to have been sent in sequence in response to different instances of the same query. For example, each of the queries 106 and 108 may correspond to a "select TOP 10 from sales" SQL statement issued periodically to obtain the ten most significant sales during the period in which the query is issued. The distributed database may process the first instance of the query by compiling the query into computer-executable instructions and executing those instructions on one of the computing nodes that make up the distributed database. Subsequent instances of the same query may be performed by executing the instructions directly. In various instances, the latency of processing the initial request may depend on the time taken to compile the query, to transmit it to a computing node, and to execute the compiled executable instructions on the computing node.

The client device 100 may include a computing device such as personal computer, mobile phone, table, server computer, and so forth. The queries sent by the device 100 may comprise requests to access data, such as commands expressed in structured query language ("SQL"). The queries might be expressed in a number of ways, including as SQL commands, proprietary and non-proprietary query languages, and so forth. More generally, the queries 106 and 108 may include source code that specifies the query in some way. The queries 106 may, in some instances, be used to form the source code rather than explicitly include it. Forming the source code can include generating the source code and storing the corresponding information on a storage device. The source code may be formed, for example, by combining a template file containing boilerplate code with the text of a query, and storing the combination in a source code file.

In some cases, a query may comprise imperative instructions in addition to, or instead of, a request to access data. Accordingly, as used herein the term "query" may include imperative instructions, non-imperative instructions, SQL statements, "NoSQL" statements, and so on. These examples are not intended to be limiting, as the queries 106 and 108 may include any type of source code that may be compiled. Compilation may refer to processing, such as parsing and lexical analysis, performed on source code to form either processor-executable instructions or an intermediate representation that may be translated or interpreted to form processor-executable instructions. If compiled using the same set of options, the compiled code associated with each of queries 106 and 108 may perform the same function, typically by the same set of processor-executable instructions or the same set of intermediate representation of processor-executable instructions.

The distributed database may comprise a master computing node 102 and one or more servant computing nodes 104. The master computing node 102 may coordinate the activities of the depicted servant computing nodes 104. The master computing node 102 may compile queries, or portions thereof, into processor-executable instructions that may be executed on one or more of the servant computing nodes 104. The master computing node 102 may, for example, send a copy of an executable program to one or more of the servant computing nodes 104, and send a command to the one or more of the servant computing nodes 104 indicating that the program should be executed. The program, when executed, may cause the query to be processed. The master computing node 102 may receive the results of executing the program. In other words, the master computing node 102 may receive the results of processing the query on one or more of the servant computing nodes 104 and assemble the results from each of the servant computing nodes 104 into a final result.

For example, the master computing node 102 may receive a first query 106. In response to receiving the first query 106, the master computing node 102 may compile the first query 106 to a first version of a program 110. The master computing node 102 may send the first version of the program 110 to the servant computing nodes 104, and send a command to the servant computing nodes 104 to execute the program. In some cases, the program and/or the command may be sent to a subset of the servant computing nodes 104. The servant computing nodes 104 may then process the first query 106 by executing the program. Each of the servant computing nodes 104 may then return the results of processing the query to the master computing node 102, which may assemble the results from each of the servant computing nodes 104 into a result set.

The response time for performing these operations may be a function of the time to compile the first version of the program 110, transmit the first version of the program 110 to the servant computing nodes 104, and executing the program. These factors may be affected by various options applied to the compilation of the first version of the program 110. For example, the first version of the program 110 may be compiled with size-minimization flags that cause the size of the first version of the program 110 to be reduced. The reduced size may reduce compilation time and/or transmission time. Similarly, disabling or excluding certain options—such as those that specify the generation of debugging symbols—may cause compilation time and/or transmission time to be increased. Similar effects may occur regarding execution time.

It may be, however, that the compilation options used for compiling the first version of the program 110 are not those best suited to producing an executable for long-term use. For example, debugging information might have been excluded from the first version of the program 110 in order to reduce compilation time and transmission time. The debugging information may, however, be valuable in the event that the query ceases to execute properly.

The master computing node 102 may compile a second version of the program 110, also based on the first query 106. The second version of the program 112 may be compiled using a second set of compilation objects that are selected based on those properties desired for longer-term use, as compared to the first version of the program 108. For example, the second set of compilation options might specify that debug information should be generated, and as a result the second version of the program 112 may contain debugging symbols.

The master computing node 102 may, in some cases, begin compiling the second version of the program 112 after compiling the first version of the program 110. For example, the master computing node 102 may begin compiling the second version of the program 112 while the first version of the program 110 is being transmitted from the master computing node 102 to the servant computing nodes 104. The servant computing nodes 104 may, for example, receive the second version of the program 112 while they are executing the first version of the program and/or are transmitting the first query results 116. The servant computing nodes 104 may then execute the second version of the program 112 in response to second query 108, and additional subsequent instances of the same query. Executing the second version of the program 112 may result in second query results 114 being transmitted to the master computing node 102, where they may be combined with other results and returned to the client device 100.

The second version of the program 112 may, as a result of using a different compiler option set, include debugging symbols and other types of instrumentation that were excluded from the first version of the program 110. The compiler option set used for the second version of the program 112 may be selected in view of compiling and transmitting the second version of the program 112 within the time it takes for the first version of the program to be compiled, transmitted, and executed. This approach may allow for the second version of the program 112 to be used in conjunction with all instances of the query other than the first.

Note that in some instances, one or more master computing nodes may operate in conjunction with one or more servant computing nodes. In some instances, master computing nodes may be located remotely with respect to the servant computing nodes. For example, the servant computing nodes might be hosted, by a computing services provider, at a remote data center, while the master computing nodes might be located at the premises of the provider's customers.

Figure 2:
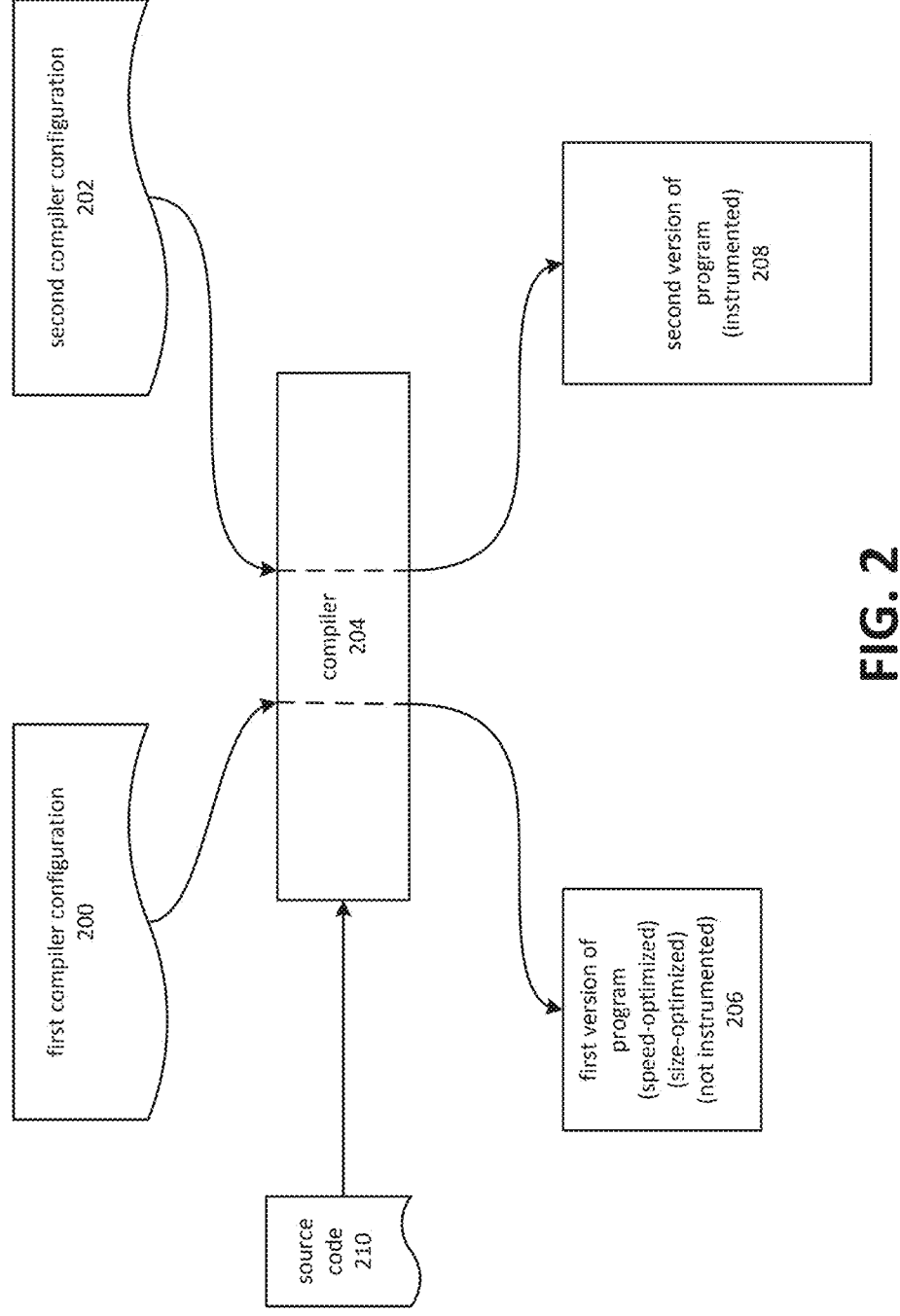
FIG. 2 is a block diagram depicting first and second versions of a program compiled with alternate compiler option sets.

FIG. 2 is a block diagram depicting first and second versions of a program compiled with alternate compiler option sets. A compiler 204, as used herein, may include various computer programs that may be employed to translate source code into computer-executable instructions. A compiler may, in some instances, form instructions that are subsequently compiled or interpreted by a runtime. For example, a compiler may translate a source code file into intermediate-language instructions that are further compiled into processor-executable instructions at runtime. The compiler 204 may also include a linking function that merges groups of processor-executable instructions into program files.

The source code 210 may, generally speaking, define a function that is to be performed by a servant computing node. In relation to distributed databases and database queries, the function performed by the servant computing node may include retrieving, filtering, merging, and otherwise processing data maintained on the servant computing node.

As depicted by FIG. 2, the operation of the compiler may be driven by various configurations. A first compiler configuration 200 may correspond to a set of options that correspond to a first version of a program 206 compiled from a source code 210. The first compiler configuration 200 may include options that cause the first version of the program 206 to be compiled using speed and size optimizations, and without instrumentation. These options may, for example, be selected to reduce the sum of compilation time, transmission time, and execution time with respect to the first version of the program 206.

The second version of the program 208 may be based on a second compiler configuration 202. The second compiler configuration 202 may include options that cause the second version of the program 208 to be instrumented. For example, the second compiler configuration 202 may include an option that causes the compiler 204 to build the second version of the program 208 with debugging symbols.

In some cases, the configuration of a compiler may be reflected in the compiler program itself, such that a first compiler executable program corresponds to the first compiler configuration 200, and a second compiler executable program corresponds to the second compiler configuration 202.

In an example, the compiler 204 may be a compiler program that accepts a "-g" option to its command line. The "-g" option may indicate that the compiler 204 should produce debugging information for the program it is compiling. The debugging information can include, for example, the names of variables, methods, and functions that have been compiled and information that is indicative of the memory locations of those variables, methods, and functions.

The use of the "-g" option may be associated with longer compile times and larger executable files. In various instances, the "-g" option may be excluded from the first compiler configuration 200 and included in the second compiler configuration 202. The size and compile time of the first version of the program 206 may therefore be reduced relative to the size and compile time of the second version of the program 208.

In an example, the compiler 204 may also accept a "-O" options, or similarly options such as "-O1," "-O2," "-O3," and so forth. These and other similar or related options may control optimizations applied by the compiler to the generated code. For example, some optimizations may cause certain functions to be made inline in order to increase speed, balanced by an increase in program size. In another example, the generated code may be tailored to a certain class of processor. These examples are not intended to be limiting. Options related to optimization may be included in both the first compiler configuration 200 and the second compiler configuration 202. Regarding the first compiler configuration 200, the particular optimization options may be selected in order to reduce the sum of compilation, transmission, and execution time. Regarding the second compiler configuration 200, the particular optimization options that may be used may be selected in order to reduce execution time, and for other reasons such as not interfering with the use of debugging symbols.

Figure 3:
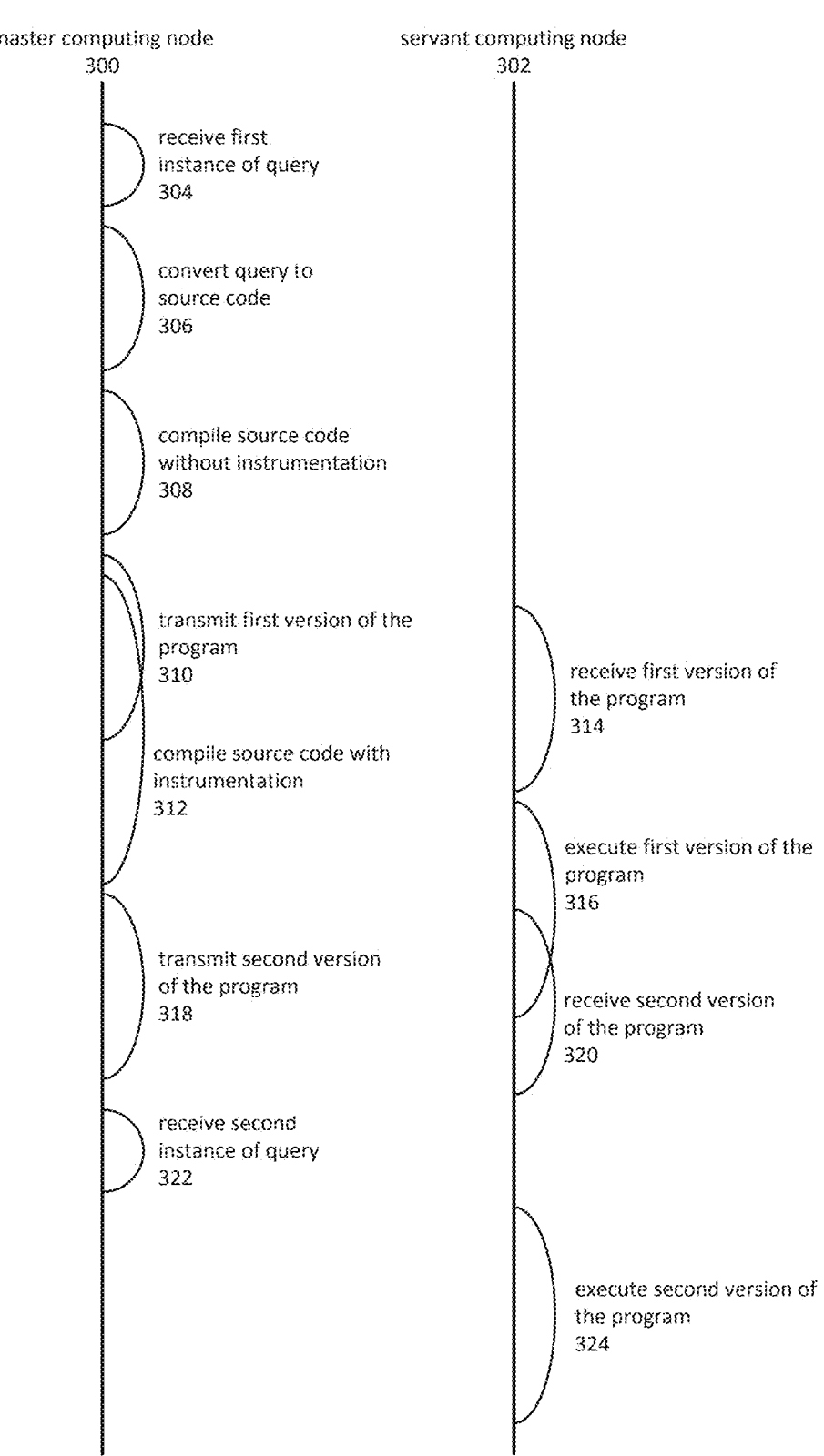
FIG. 3 is a time flow diagram depicting a master computing node and a servant computing node processing two instances of a query.

FIG. 3 is a time flow diagram depicting a master computing node 300 and a servant computing node 302 processing two instances of a query. FIG. 3 is intended to be illustrative of various possible interactions, and sequences thereof, between the depicted computing nodes of a distributed computing system. It should not be viewed as limiting the scope of the present disclosure to only the particular interactions that are depicted in the figure.

FIG. 3 depicts a series of events occurring on a master computing node 300 with respect to events occurring on a servant computing node 302. At event 304, the master computing node 300 may receive a query.

At event 306, the master computing node may convert the query to source code that can be compiled. The source code may define a function to be performed by the servant computing node 302. The source code may, for example, define an executable program that utilizes a database call-level interface to invoke the query on a database partition hosted by the servant computing node 302. The received query, in such instances, may be inserted into a template for the source code that may then be compiled. In another example, the received query may be compiled directly into executable, intermediate, or interpretable instructions that may be performed on the servant computing node 302. In some instances, the servant computing node 302 may execute a portion of the query, such that other servant computing nodes (not depicted) may execute the remaining portions.

At event 308, the master computing node 300 may cause the source code to be compiled into an executable program. The compilation options may be set to exclude instrumentation in order to reduce overall compilation, transmission, and execution time. At event 310, the master computing node 300 may transmit the first version of the program to the servant computing node 302. The servant computing node 302 may, as depicted by event 314, receive the first version of the program and execute it, as depicted by event 316.

The latency of the first request may be viewed as the sum of time taken to process events 304 through 316. The compilation options (or more generally, the compiler configuration) may be selected such that the sum of the compilation, transmission, and execution times is reduced. As a result, the latency of the first request is also reduced.

The master computing node 300 may perform additional actions in parallel to those related to the first version of the program. As depicted by event 312, the master computing node 300 may compile the source code and produce a second version of the program while it is transmitting the first version of the program. The second version of the program may be compiled to include instrumentation. In some cases, the compiler configuration may cause various code optimizations to be applied in addition to including the instrumentation. As depicted by events 318 and 320, the second version of the program may be transmitted by the master computing node 300 and received by the servant computing node 302.

As depicted by FIG. 3, the servant computing node 302 may, in some cases, receive the second version of the program while it is executing the first version of the program. This may be seen by the depicted overlap between events 316 and 320. In various instances the second version of the program may be received at a time subsequent to receiving the first version of the program.

At event 322, the master computing node may receive a second instance of a query that is to be performed, in whole or in part, on the servant computing node 302. The master computing node 300 may send a command to the servant computing node 302 to indicate that it should execute the currently available version of the program. In the example of FIG. 3, this may be the second version of the program, received at event 320. In some instances, a number of instances of the same query might be received prior to compilation and transmission of the second version of the program. In such instances, the first version of the program may be executed in response to each received instance of the query, until the second version of the program has been compiled and transmitted. However, in the example of FIG. 3, it may be presumed for the purpose of example that the second version of the program was received prior to the second instance of the query. The servant computing node 302 may execute the second version of the program in response to the receiving, by the master computing node 300, of the second instance of the query. This operation is depicted by event 324.

Figure 4:
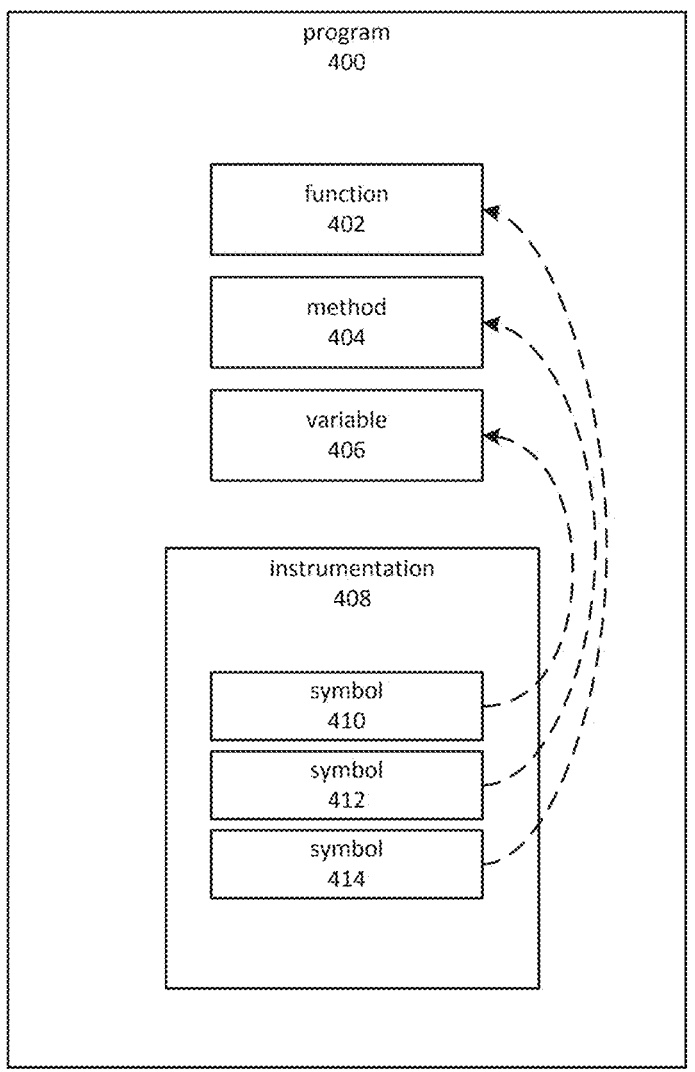
FIG. 4 is a block diagram depicting an example of program instrumentation.

FIG. 4 is a block diagram depicting an example of program instrumentation. A program 400 may be compiled to include instrumentation, which may generally be described as data or metadata that involves the content, structure, or operation of the program 400. The instrumentation may be stored within the one or more files that make up the program 400. In some cases, some or all of the instrumentation may be included in an additional file that is not directly part of the program. For example, instrumentation may be included in a program database file.

In the example of FIG. 4, instrumentation 408 is included within program 400. For example, data and metadata related to the instrumentation 408 may be included in an executable file or code library that is part of the program 400. This data or metadata may include, for example, symbols 410-414. A symbol may represent the name of an entity such as a function, method, or variable, which is a component of the program 400. The symbol may also contain an associated reference to a memory location or offset. The memory location or offset may allow the function, method, or variable to be located when a debugging function is being performed. For example, as depicted in FIG. 4, symbol 410 may refer to the location of variable 406, symbol 412 to the location of method 404, and symbol 414 to the location of function 402. Note that variables, methods, and functions are intended to be non-limiting examples of various aspects of program 400 that might be represented by a symbol. In some cases, location information associated with symbols 410-414 may represent offset information. The offset information may be used to calculate the address of a function, method, or variable, in the memory of a computing device when it is executing the program 400.

Figure 5:
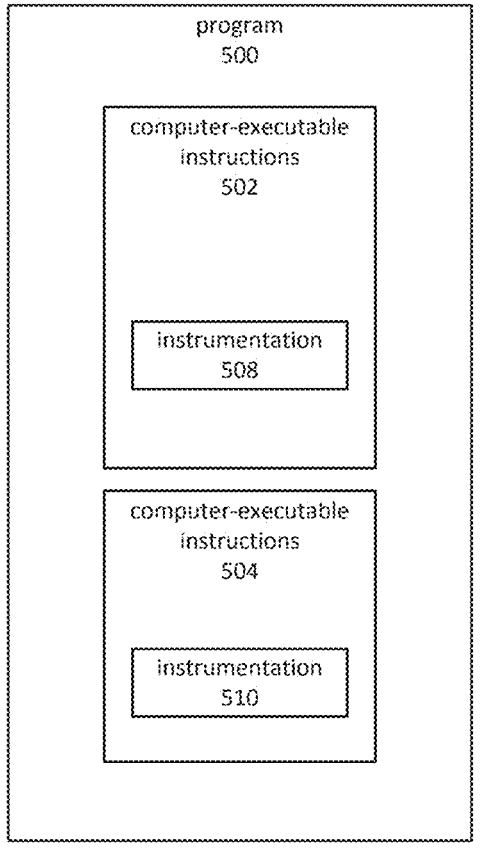
FIG. 5 is a block diagram depicting an additional aspect of program instrumentation.

FIG. 5 is a block diagram depicting an additional aspect of program instrumentation. A program 500 may include various functions and methods, each having a corresponding set of computer-executable instructions 502-504. In some instances, a method or function may comprise various diagnostic procedures or other elements, typically also implemented using computer-executable instructions. For example, a function or method might correspond to the computer-executable instructions 502, a subset of which might correspond to instrumentation 508. The instrumentation 508 might comprise an assert function, trace function, log function, and so forth. Similarly, a second function or method might correspond to a second set of computer-executable instructions 504, which might contain instructions corresponding to instrumentation 510. The instrumentation 510 in the second function or method might comprise similar diagnostic features.

The configuration of a compiler may, in some cases, control whether or not the instrumentations 508 and 510 are included in a program. For example, the subset of computer-executable instructions 502 that corresponds to instrumentation 508 may be included or excluded from the program 500 based on compiler definitions and an "#ifdef" compiler pragma. The inclusion or exclusion of the instrumentations 508 and 510 may affect the time used to compile the program 500 and the time to execute the program 500. Accordingly, a distributed system, such as the distributed system depicted in FIG. 1, may cause the instrumentations 508 and 510 to be excluded when compiling the first version of a program 110 and included in a second version of the program 112.

Figure 6:
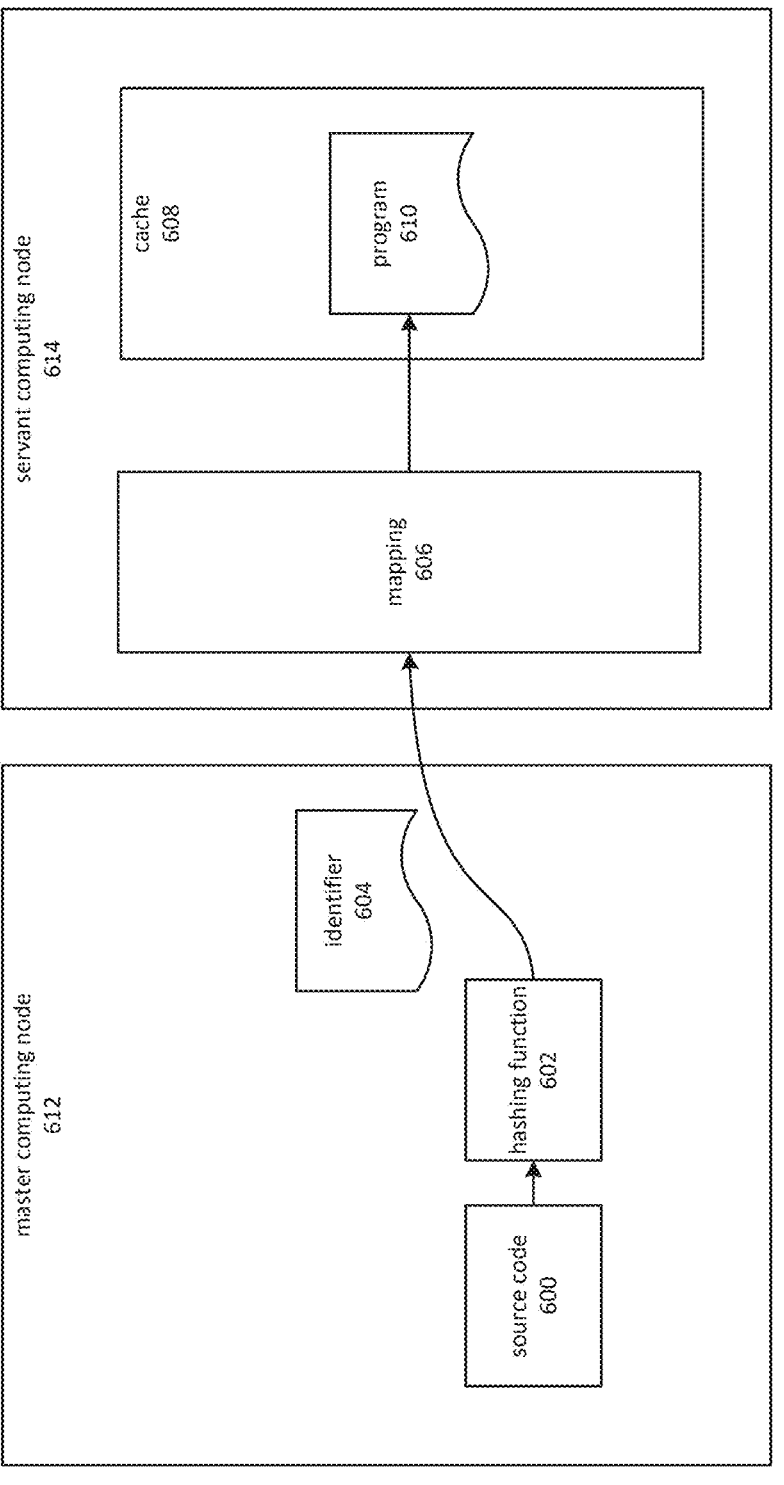
FIG. 6 is a block diagram depicting a cache of compiled programs.

The program 500 may be maintained in a cache on the servant computing node. An example of such a cache is depicted in FIG. 6, which is a block diagram depicting a cache of compiled programs. A servant computing node 614 may maintain a cache 608 of compiled programs, such as the depicted program 610. The cache 608 may, in some instances, include a database that maintains copies of the compiled programs. In some instances, the cache 608 may include a table, list, or other data structure that refers to the locations on a storage device for the cached programs, such as the depicted program 610.

The cache 608 may operate to store and retrieve compiled programs based on mappings between identifiers and programs stored in the cache 608. For example, a mapping 606 may include data that relates an identifier 604 to a program 610 that is in the cache 608.

The master computing node 612 may assign or compute an identifier 604. For example, as depicted in FIG. 6, the master computing node 612 may apply a hashing function 602 to source code 600 to compute an identifier 604. The use of the hashing function 602, applied to source code 600, may ensure that the same identifier 604 is associated with both the first and second versions of the program. The generation or assignment of an identifier 604 to the program 610 may be done so that the same identifier 604 is associated with both the first and second versions of the program. The servant computing node 614 may use the constancy of the identifier 604 to replace the first version of the program 610 in the cache with a second version of the program 610 when it is transmitted by the master computing node 612. Replacing can include deleting the original program 610 and replacing it with a new version, or adding a new version of the program 610 and marking the old version as deleted. Replacing the program can also involve other mechanisms for causing a new version of the program to be used instead of an existing version.

FIG. 7 is a flow diagram depicting executing a query using two-stage query compilation. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel. Embodiments of the depicted process may be implemented using various combinations of computer-executable instructions executed by a computing system, such as the computing systems described herein.

Block 700 depicts receiving a command to execute a query language statement. The command may, in some instances, contain a textual representation of a query language statement, such as a SQL command. In some instances, the command may contain a binary representation of a query language statement.

Block 702 depicts forming source code that corresponds to the query language statement. In some instances, the query language statement may be suitable for compilation without first being modified, and may therefore be considered to be source code. In other instances, the source code may be formed using the query language statement. For example, a master computing node may form source code that includes the query language statement. This may involve forming source code that specifies commands for connecting to a database, processing the query language statement, and returning the results of processing the query language statement to the master computing node. The source code may also include additional elements, such as a "main" program function and various supporting procedures and methods.

Block 704 depicts compiling a first version of a program for executing the query language statement. The program may be compiled using the source code formed at block 702. The configuration of the compiler may be such that compilation of the first version is optimized for speed of compilation, speed of transmission of the program to a servant computing node, and speed of execution. The compiler configuration may be such that the sum of compilation, transmission, and execution time is reduced relative to other compiler configurations. In some cases, the compiler configuration may optimize for a subset of these elements or weight these elements differently. For example, if the link between the master computing node and the servant computing node is a very high speed link, then the compiler configuration may disregard, to varying degrees, the speed at which the program may be transmitted. If the link is slow; however, the speed of transmission might be optimized. In various instances, it may be necessary to trade off a factor such as execution speed for a factor such as transmission speed. The compiler configuration may therefore be optimized for these factors in combination.

Block 706 depicts initiating compilation of a second version of the program, also based on the source code. The compiler may be configured to include instrumentation in the second version of the program. For example, instrumentation that was excluded from the first version of the program to aid in optimizing for speed of compilation, speed of transmission, and speed of execution may be included in the second version of the program, even though its inclusion may be adverse to these factors. More generally, in addition to or instead of instrumentation, the second version of the program may be compiled so as to include features that are desired but otherwise contrary to the various factors for which compilation of the first version of the program was optimized.

The operations depicted by block 706 may be performed, in some instances, subsequent to compiling the first version of the program and may also be conducted while other operations, such as those depicted by block 708, are in progress. Block 708 depicts transmitting the first version of the program to a servant computing node and causing the servant computing node to execute the first version of the program. For example, the master computing node may transmit the first version of the program to the servant computing node. The master computing node may also supply an identifier to the servant computing node that may be used to identify the program. The identifier may be included in a command to execute the program that may be sent by the master computing node to the servant computing node. Block 708 depicts the command being sent to the servant computing node in response to the initial receipt of a command to execute the query language statement.

Block 710 depicts transmitting the second version of the program to the servant computing node. The second version may be transmitted with the same identifier sent with the first version of the program. The servant computing node may use the identifier to locate the first version of the program in a cache and replace it with the second version of the program. The operations depicted by block 710 may be performed, in some instances, while the operations depicted by block 708 are being performed. In some instances, for example, the transmission of the second version of the program may take place while the servant computing node is executing the first version of the program.

As depicted by block 712, the second version of the program may be executed in response to receiving a second command to execute the query language statement. For example, the servant computing node may receive the second version of the program and store it in its cache of programs. When the master computing node then receives a command to execute a query language statement, it may determine that it has already compiled a first and second version of a program using source code that was formed based on the query language statement, and transmitted the programs to the servant computing node. The master computing node may then send a command to the servant computing node to execute the program. If the servant computing node has already received the second version of the program, it may execute that version instead of the first version of the program. Typically, the second version of the program is executed in response to all requests to process the same query language statement that are received subsequent to the compilation and transmission of the second version of the program to the servant computing node.

Figure 8:
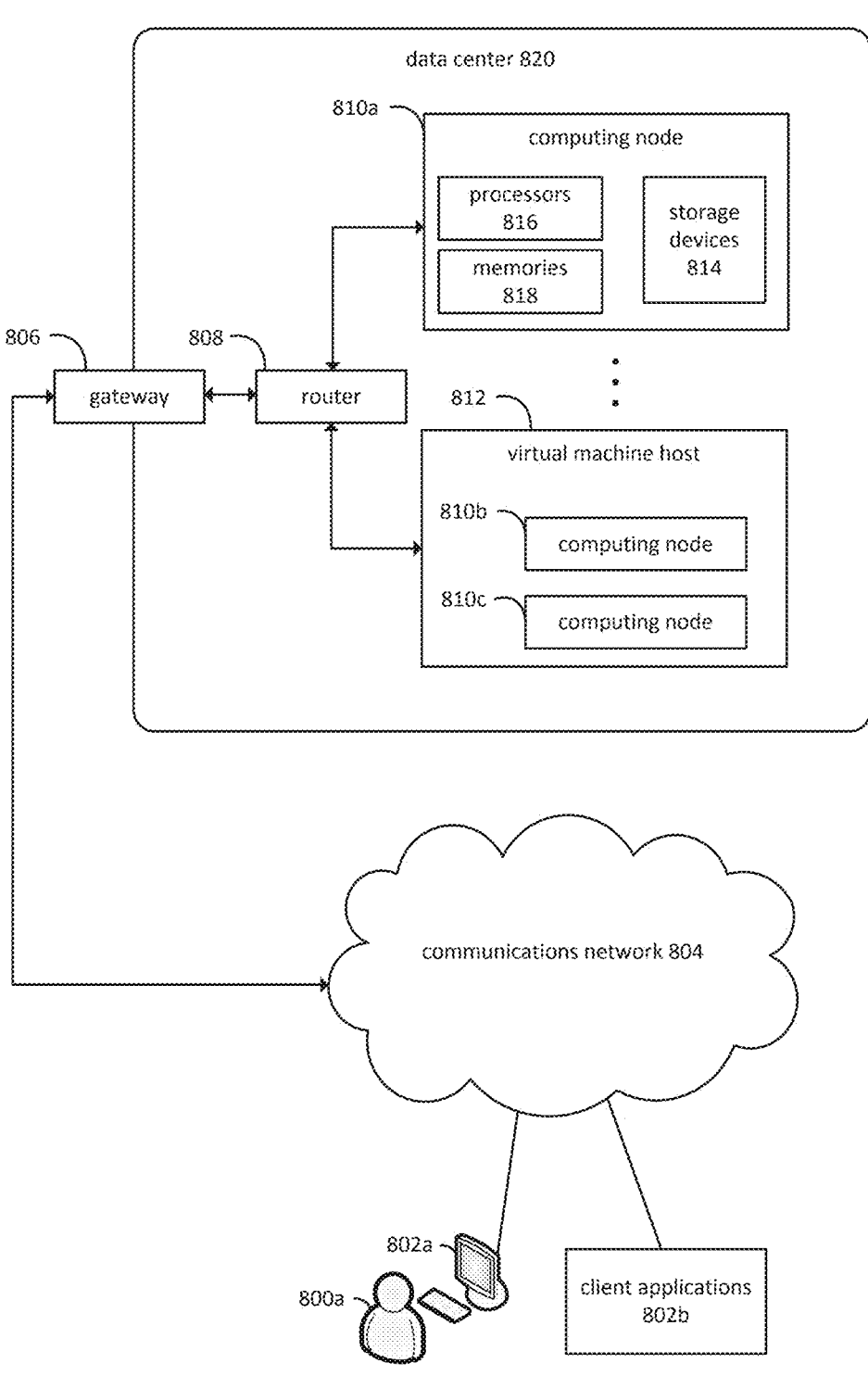
FIG. 8 is a block diagram depicting an embodiment of a computing environment in which aspects of the present disclosure may be practiced.

FIG. 8 is a diagram depicting an example of a distributed computing environment on which aspects of the present invention may be practiced. Various users 800a may interact with various client applications, operating on any type of computing device 802a, to communicate over communications network 804 with processes executing on various computing nodes 810a and 810b within a data center 820. Alternatively, client applications 802b may communicate without user intervention. Communications network 804 may comprise any combination of communications technology, including the Internet, wired and wireless local area networks, fiber optic networks, satellite communications, and so forth. Any number of networking protocols may be employed.

Communication with processes executing on the computing nodes 810a and 810b may be provided via gateway 806 and router 808. Numerous other network configurations may also be employed. Although not explicitly depicted in FIG. 8, various authentication mechanisms, web service layers, business objects, or other intermediate layers may be provided to mediate communication with the processes executing on computing nodes 810a and 810b. Some of these intermediate layers may themselves comprise processes executing on one or more of the computing nodes. Computing nodes 810a and 810b, and processes executing thereon, may also communicate with each other via router 808. Alternatively, separate communication paths may be employed. In some embodiments, data center 820 may be configured to communicate with additional data centers, such that the computing nodes and processes executing thereon may communicate with computing nodes and processes operating within other data centers.

Computing node 810a is depicted as residing on physical hardware comprising one or more processors 816a, one or more memories 818a, and one or more storage devices 814a. Processes on computing node 810a may execute in conjunction with an operating system or alternatively may execute as a bare-metal process that directly interacts with physical resources, such as processors 816a, memories 818a, or storage devices 814a.

Computing node 810b may comprise a virtualization component 812, which may include a virtual machine host and virtual machine instances to provide shared access to various physical resources, such as physical processors, memory, and storage devices. These resources may include the depicted processors 816b, memories 818b, and storage devices 814b. Any number of virtualization mechanisms might be employed to provide shared access to the physical resources.

The various computing nodes depicted in FIG. 8 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented without the use of virtualization, computing nodes may include one or more memories configured to store computer-readable instructions and one or more processors configured to read and execute the instructions. A computing node may also comprise one or more storage devices, network interfaces, communications buses, user interface devices, and so forth. Computing nodes may also utilize virtualized computing resources, such as virtual machines implemented with or without a hypervisor, virtualized bare-metal environments, and so forth. A virtualization-based computing node therefore encompasses both the virtualization resources and the physical hardware needed to execute the virtualization resources. A computing node may be configured to execute an operating system and application programs. In some embodiments, a computing node might also comprise bare-metal application programs.

Figure 9:
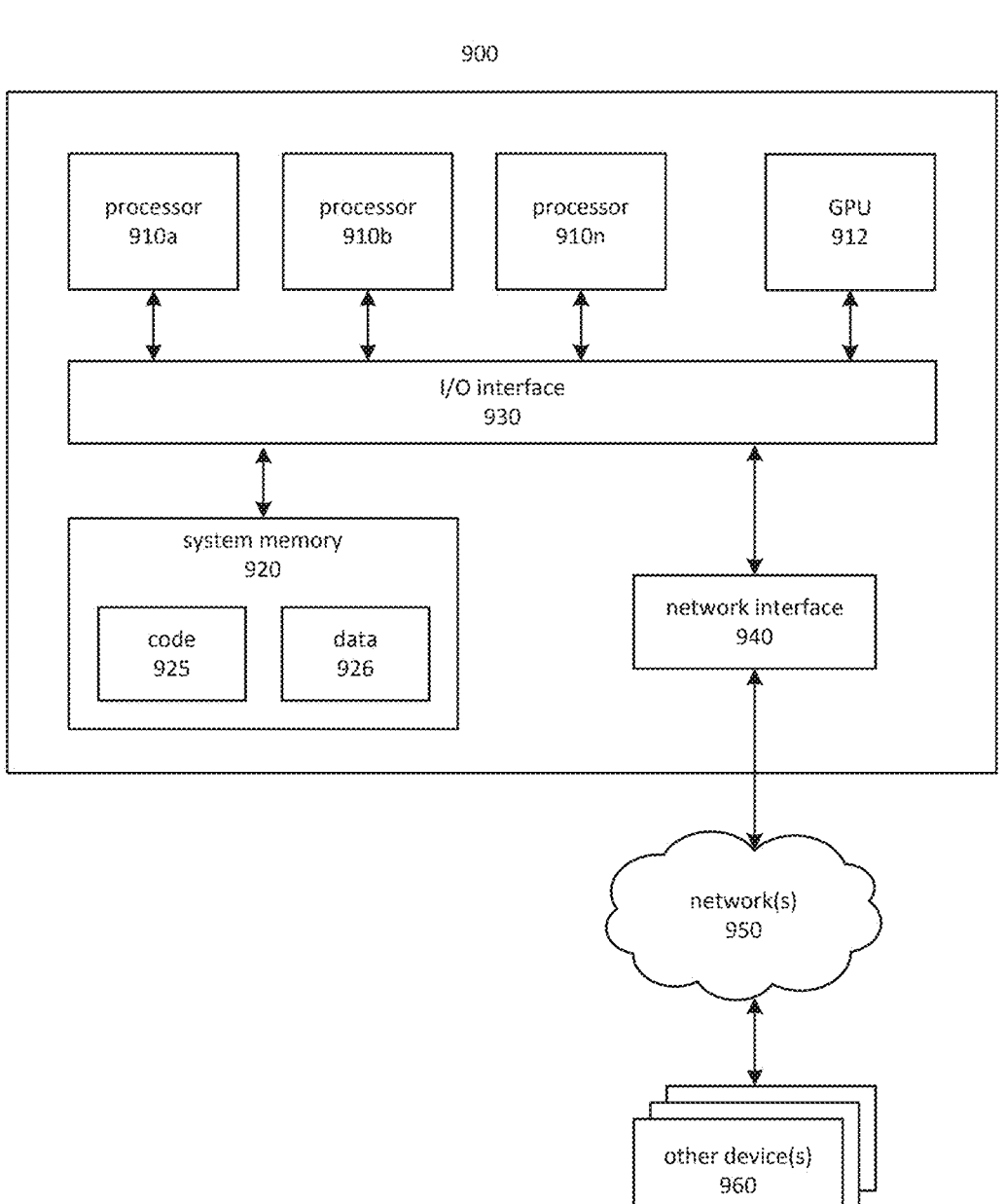
FIG. 9 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 9 depicts a general-purpose computer system that includes or is configured to access one or more computer-accessible media. In the illustrated embodiment, computing device 900 includes one or more processors 910a. 910b, and/or 910n (which may be referred herein singularly as a processor 910 or in the plural as the processors 910) coupled to a system memory 920 via an input/output ("I/O") interface 930. Computing device 900 further includes a network interface 940 coupled to I/O interface 930.

In various embodiments, computing device 900 may be a uniprocessor system including one processor 910 or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures ("ISAs"), such as the x86, PowerPC, SPARC or MIPS ISAs, or any other suitable ISA. In multiprocessor systems, each of processors 910 may commonly, but not necessarily, implement the same ISA.

In some embodiments, a graphics processing unit ("GPU") 912 may participate in providing graphics rendering and/or physics processing capabilities. A GPU may, for example, comprise a highly parallelized processor architecture specialized for graphical computations. In some embodiments, processors 910 and GPU 912 may be implemented as one or more of the same type of device. In some instances, the GPU 912 may perform calculations and execute instructions in cooperation with or in place of the processor 910. Accordingly, as used herein, the term processor may encompass a GPU. Similarly, other highly parallelized processor architectures that supplement or replace the operation of the primary processor 910 are also encompassed by the term processor.

System memory 920 may be configured to store instructions and data accessible by processor(s) 910. In various embodiments, system memory 920 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 920 as code 925 and data 926.

In one embodiment. I/O interface 930 may be configured to coordinate I/O traffic between processor 910, system memory 920, and any peripherals in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments. I/O interface 930 may include support for devices attached through various types of peripheral buses, such as a variant of the Peripheral Component Interconnect ("PCI") bus standard or the Universal Serial Bus ("USB") standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940) may be configured to allow data to be exchanged between computing device 900 and other device or devices 960 attached to a network or networks 950, such as other computer systems or devices, for example. In various embodiments, network interface 940 may support communication via any suitable wired or wireless general data networks, such as types of Ethernet networks, for example. Additionally, network interface 940 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 920 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 900 via I/O interface 930. A non-transitory computer-accessible storage medium may also include any volatile or non-volatile media, such as RAM (e.g., SDRAM. DDR SDRAM, RDRAM, SRAM, etc.). ROM, etc., that may be included in some embodiments of computing device 900 as system memory 920 or another type of memory. Further, a computer-accessible medium may include transmission media or signals, such as electrical, electromagnetic or digital signals, conveyed via a communication medium, such as a network and/or a wireless link, such as those that may be implemented via network interface 940. Portions or all of multiple computing devices, such as those illustrated in FIG. 9, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

The computing device 900 may be configured by software instructions to contain a module (not shown). A module is a component of the computing device 900 that includes a set of instructions, loaded in whole or in part into system memory 920, for performing a set of related functions, including input and output with other modules. The code 925 and data 926 of system memory 920 are altered by the loading of the instructions. The operation of a module is effected by interchange between processor 910, or in a multiprocessor system 910a-910n and/or GPU 912, and the system memory 920 via I/O interface 930. A module may interact with other modules of the computing device 900 via system memory 920, and with other devices 960 via network interface 940 and network 950.

A compute node, which may be referred to also as a computing node, may be implemented on a wide variety of computing environments, such as tablet computers, personal computers, smartphones, game consoles, commodity-hardware computers, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/ or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, instructions executed by one or more computers or computer processors. The instructions may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software instructions and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the instructions, systems, and data structures may also be stored (e.g., as software instructions or structured data) on a computer-readable medium, such as a hard disk, a memory, a network, or a portable media article to be read by an appropriate device or via an appropriate connection. The instructions, and data structures may also be transmitted as generated data signals (e.g., as part of a carrier wave or other analog or digital propagated signal) on a variety of computer-readable transmission media, including wireless-based and wired/ cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system, comprising:

at least one processor; and at least one memory to store processor-executable instructions that, in response to being executed by the at least one processor, cause the system to at least:

receive a statement of a query language;

form a first compiled version of the statement that excludes instrumentation;

send a copy of the first compiled version of the statement to a second computing node;

form a second compiled version of the statement that includes instrumentation; and send a copy of the second compiled version of the statement, including the instrumentation, to the second computing node, wherein the second computing node executes the first compiled version of the statement until the second compiled version of the statement is received by the second computing node, and the first compiled version of the statement is formed by a compiler with a configuration selected to reduce a compilation time compared to a compilation time to form the second compiled version of the statement.

2. The system of claim 1, wherein a first length of time to form, send, and execute the first compiled version of the statement is less than a second length of time to form, send, and execute the second compiled version of the statement.

3. The system of claim 1, wherein the at least one memory comprising further instructions that, in response to being executed by the at least one processor, cause the system at least to send the first compiled version of the statement in parallel with forming the second compiled version of the statement.

4. The system of claim 1, wherein the at least one memory comprising further instructions that, in response to being executed by the at least one processor, cause the system at least to:

store a record indicative of a mapping between the statement and the first compiled version of the statement;

update the record indicative of the mapping to refer to the second compiled version of the statement in response to receiving the second compiled version of the statement; and determine, in response to a second command, to execute the second compiled version of the statement based on least in part on the updated record indicative of the mapping.

5. The system of claim 1, wherein the second computing node at least:

determines that the first compiled version of the statement is executing; and replaces the first compiled version of the statement with the second compiled version of the statement at least partially in response to completing execution of the first compiled version of the statement.

6. A method of executing compiled programs, the method comprising:

receiving a first program compiled from a source code derived from a first instance of a command to perform a function, the first program compiled using a first compiler configuration, the first compiler configuration selected to reduce compilation time and program size compared to a compilation time and program size that would result from using a second compiler configuration;

executing the first program in response to receiving the first instance of the command to perform the function;

receiving a second program compiled using the second compiler configuration;

determining to execute the second program, instead of the first program, in response to receiving a second instance of the command to perform the function subsequent to receipt of the second program; and executing the second program in response to receiving the second instance of the command to perform the function.

7. The method of claim 6, wherein the first compiler configuration corresponds to compiling without debugging information and the second compiler configuration corresponds to compiling with debugging information.

8. The method of claim 6, wherein the second compiler configuration includes optimization options associated with at least one of increased compile time or increased program size.

9. The method of claim 6, further comprising:

storing information indicative of a mapping between an identifier and the first program, the identifier based at least in part on the source code;

updating the information indicative of the mapping to refer to the second program in response to receiving the second program; and determining to execute the second program based on least in part on the updated information indicative of the mapping.

10. The method of claim 6, further comprising:

determining that the first program is executing; and replacing the first program with the second program at least partially in response to completing the executing of the first program.

11. The method of claim 6, wherein the determining to execute the second program is based at least in part on a fault associated with execution of the first program.

12. The method of claim 6, wherein the second program comprises instrumentation.

13. The method of claim 12, wherein the instrumentation comprises debugging symbols.

14. A system comprising:

at least one processor; and at least one memory that stores processor-executable instructions that, in response to being executed by the at least one processor, cause the system to at least:

compile, in response to a first request associated with performing a set of instructions defined by a source code associated with processing data, a first program from the source code using a first configuration of a compiler that causes the compiler to exclude instrumentation from the first program, the first configuration of the compiler selected to reduce compilation time and program size compared to a compilation time and program size that would result from using a second configuration of the compiler;

send, in response to the first request, a first command to a second computing node to perform the set of instructions, wherein the second computing node performs the instructions by executing the first program;

compile a second program from the source code using the second configuration of the compiler that causes the compiler to generate instrumentation corresponding to the second program; and in response to a second request associated with performing the set of instructions, the second request received after the second program has been compiled, send a second command to the second computing node to perform the set of instructions, wherein the second computing node performs the instructions by executing the second program.

15. The system of claim 14, wherein the first configuration of the compiler is associated with a reduction in a size of the first program relative to the second program.

16. The system of claim 14, wherein the source code comprises a database query.

17. The system of claim 14, wherein the at least one memory comprising further instructions that, in response to being executed by the at least one processor, cause the system at least to:

receive a query from a client device; and form the source code based at least in part on the query.

18. The system of claim 14, wherein the instrumentation comprises debugging symbols.

19. The system of claim 14, wherein the at least one memory comprising further instructions that, in response to being executed by the at least one processor, cause the system at least to:

compile the first program with a compiler configuration selected based at least in part on reducing a total amount of time for compiling the first program, sending the first program, and executing the first program.

20. The system of claim 14, wherein the at least one memory comprising further instructions that, in response to being executed by the at least one processor, cause the system at least to:

select the first configuration based at least in part on an estimated amount of time required to compile the second program using the second configuration and an estimated amount of time to send the second program to the second computing node.

* * * * *